United States Patent
Hall et al.

(10) Patent No.: US 11,964,716 B2
(45) Date of Patent: Apr. 23, 2024

(54) MULTI-FUNCTION TRAILER

(71) Applicant: Hall Labs LLC, Provo, UT (US)

(72) Inventors: Stephen Hall, Provo, UT (US); David R. Hall, Provo, UT (US); Levi Ellis, Springville, UT (US); Justen Hansen, Stansbury Park, UT (US)

(73) Assignee: Hall Labs LLC, Provo, UT (US)

( * ) Notice: Subject to any disclaimer, the term of this patent is extended or adjusted under 35 U.S.C. 154(b) by 344 days.

(21) Appl. No.: 17/463,477

(22) Filed: Aug. 31, 2021

(65) Prior Publication Data

US 2022/0063741 A1    Mar. 3, 2022

Related U.S. Application Data

(60) Provisional application No. 63/072,906, filed on Aug. 31, 2020.

(51) Int. Cl.
| | |
|---|---|
| *B62D 63/06* | (2006.01) |
| *B60D 1/54* | (2006.01) |
| *B60D 1/60* | (2006.01) |
| *B60J 1/08* | (2006.01) |
| *B60P 3/07* | (2006.01) |

(Continued)

(52) U.S. Cl.
CPC ............. *B62D 63/061* (2013.01); *B60D 1/54* (2013.01); *B60D 1/60* (2013.01); *B60J 1/08* (2013.01); *B60P 3/07* (2013.01); *B60P 3/38* (2013.01); *B62D 21/20* (2013.01); *B62D 27/02* (2013.01); *B62D 63/08* (2013.01)

(58) Field of Classification Search
CPC ...... B60D 1/54; B60D 1/60; B60D 2001/544; B60D 2001/542; B60D 2001/546; B60P 3/07; B60P 3/34; B60P 3/38; B60P 3/39; B60P 3/42; B60P 3/423; B62D 21/20; B62D 53/06061; B62D 53/062; B62D 53/0828; B62D 63/06; B62D 63/061
See application file for complete search history.

(56) References Cited

U.S. PATENT DOCUMENTS 3,574,388 A * 4/1971 Stone ........................ B60P 3/04
                                                     280/43.23
4,013,303 A * 3/1977 Milner ..................... B60D 1/54
                                                     280/491.4

(Continued)

*Primary Examiner* — Gregory A Blankenship

(57) ABSTRACT

A trailer is disclosed which includes a first door with a first hinge configured to allow the first door to operate between an open position and a closed position, and a second door on the opposing side of the trailer with a second hinge configured to allow the second door to operate between an open position and a closed position. The trailer also includes a roof and a trailer tongue with a coupling configured to attach to a hitch of a vehicle. Two or more wheels are provided that are extendable from an up position to a down position. In this way, when the wheels are in the down position, the trailer is lifted off the ground. The trailer can thus change between at least three modes, including a first mode for storage, wherein the first door and second door are in the closed position and the wheels are in the up position; a second mode for ingress and egress, wherein at least one of the first door and second door are in the open position; and a third mode for travel, wherein the first door and second door are in the closed position and the wheels are in the down position.

17 Claims, 6 Drawing Sheets

(51) Int. Cl.
  *B60P 3/38* (2006.01)
  *B62D 21/20* (2006.01)
  *B62D 27/02* (2006.01)
  *B62D 63/08* (2006.01)

(56) References Cited

U.S. PATENT DOCUMENTS

| | | | | |
|---|---|---|---|---|
| 4,168,933 A * | 9/1979 | Kane | ............... | B60P 3/42 |
| | | | | 296/35.3 |
| 4,317,590 A * | 3/1982 | Young | ............... | B60J 7/165 |
| | | | | 296/176 |
| 4,978,134 A * | 12/1990 | Dahl | ............... | B60D 1/54 |
| | | | | 280/498 |
| 5,314,200 A * | 5/1994 | Phillips | ............... | B60P 3/42 |
| | | | | 296/26.05 |
| 6,834,882 B1 * | 12/2004 | Boyd | ............... | B60P 3/122 |
| | | | | 280/789 |
| RE38,751 E * | 7/2005 | Davis | ............... | B60D 1/54 |
| | | | | 280/491.4 |
| 8,336,940 B2 * | 12/2012 | Rasmussen | ............... | B60P 3/08 |
| | | | | 296/65.01 |
| 8,398,159 B1 * | 3/2013 | Hall | ............... | B62D 61/065 |
| | | | | 296/203.01 |
| 8,419,039 B1 * | 4/2013 | Magalhaes | ............... | B60D 1/46 |
| | | | | 280/490.1 |
| 10,683,961 B1 * | 6/2020 | Stutesman | ............... | F16M 11/046 |
| 11,084,413 B2 * | 8/2021 | Rasmussen | ............... | B60P 3/39 |
| 2007/0045993 A1 * | 3/2007 | Jager | ............... | B62D 33/0273 |
| | | | | 280/656 |
| 2007/0176396 A1 * | 8/2007 | Myers | ............... | B62D 63/062 |
| | | | | 280/491.3 |
| 2009/0033062 A1 * | 2/2009 | Goettker | ............... | B60D 1/065 |
| | | | | 280/491.3 |
| 2011/0260430 A1 * | 10/2011 | Markovich | ............... | B62D 63/062 |
| | | | | 296/26.11 |
| 2014/0093403 A1 * | 4/2014 | Jones | ............... | F04B 17/06 |
| | | | | 417/364 |
| 2015/0203155 A1 * | 7/2015 | Olsen | ............... | B60D 1/14 |
| | | | | 280/477 |
| 2016/0082796 A1 * | 3/2016 | Fincher | ............... | B60D 1/54 |
| | | | | 280/474 |
| 2016/0347230 A1 * | 12/2016 | Pellicer | ............... | B62D 33/08 |
| 2017/0057577 A1 * | 3/2017 | Blevins | ............... | B60D 1/1675 |
| 2018/0215302 A1 * | 8/2018 | Reid | ............... | B60P 1/14 |
| 2018/0319238 A1 * | 11/2018 | Denton, III | ............... | B62D 63/08 |
| 2019/0047387 A1 * | 2/2019 | Sviberg | ............... | B60J 7/02 |
| 2019/0351807 A1 * | 11/2019 | Coulter | ............... | B62D 33/0207 |
| 2019/0388953 A1 * | 12/2019 | Kibben | ............... | B21D 53/88 |
| 2020/0207171 A1 * | 7/2020 | Bosschieter | ............... | B60G 17/0165 |
| 2021/0203269 A1 * | 7/2021 | Kasefang | ............... | H02S 10/40 |
| 2021/0291602 A1 * | 9/2021 | Pair | ............... | B60D 1/60 |
| 2022/0033016 A1 * | 2/2022 | Baker | ............... | B62D 33/027 |
| 2023/0182835 A1 * | 6/2023 | Phelps | ............... | B62D 63/06 |
| | | | | 296/172 |
| 2023/0191866 A1 * | 6/2023 | Mahon | ............... | B60G 7/001 |
| | | | | 280/6.151 |
| 2023/0249627 A1 * | 8/2023 | Taylor | ............... | B60D 1/54 |
| | | | | 224/519 |

\* cited by examiner

MULTI-FUNCTION TRAILER

This application claims priority to U.S. Provisional Patent Application No. 63/072,906 titled "Multi-Function Trailer" filed on Aug. 31, 2020.

TECHNICAL FIELD

The present invention relates to trailers.

BACKGROUND

Many people have motorcycles, three-wheelers, or other recreational vehicles or toys that take up space in their garage. Some do not have space in their garage, causing them to park them outside where they are subject to theft, the weather, and other hazards. Further, some people have trailers to transport their items, which take up more space and are also subject to theft, the weather, and other hazards. What is needed is a safe enclosure to store such items.

SUMMARY

In a first aspect, a trailer is disclosed which includes a first door with a first hinge configured to allow the first door to operate between an open position and a closed position, and a second door on the opposing side of the trailer with a second hinge configured to allow the second door to operate between an open position and a closed position. The trailer also includes a roof and a trailer tongue with a coupling configured to attach to a hitch of a vehicle. Two or more wheels are provided that are extendable from an up position to a down position. In this way, when the wheels are in the down position, the trailer is lifted off the ground. The trailer can thus change between at least three modes, including a first mode for storage, wherein the first door and second door are in the closed position and the wheels are in the up position; a second mode for ingress and egress, wherein at least one of the first door and second door are in the open position; and a third mode for travel, wherein the first door and second door are in the closed position and the wheels are in the down position. In a second aspect, a trailer is disclosed with a first door with a top edge comprising a first hinge configured to allow the first door to operate between an open position and a closed position; a second door with a top edge on the opposing side of the trailer comprising a second hinge configured to allow the second door to operate between an open position and a closed position; a trailer tongue with a coupling configured to attach to a hitch of a vehicle; a roof with one or more lower edges, which is extendable from a lowered position to a raised position; wherein when the roof is in the raised position, the lower edge of the roof is above the top edge of the first and second door, and when the roof is in the lowered position, the lower edge of the roof is below the top edge of the first and second door, and wherein the roof prevents the doors from opening.

In a preferred embodiment, the first and second doors are configured so that when they are in their open position, they extend outward and down to the ground such that they can both be used as ramps, such that a vehicle can drive up the first door, through the trailer, and down the second door.

Also, in this preferred embodiment, the roof is extendable from a lowered position to an raised position, whereby the roof can be set in the lowered position for the first and third mode and set in the raised position for the second mode.

Further aspects and embodiments are provided in the foregoing drawings, detailed description and claims.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

Figure 1A:
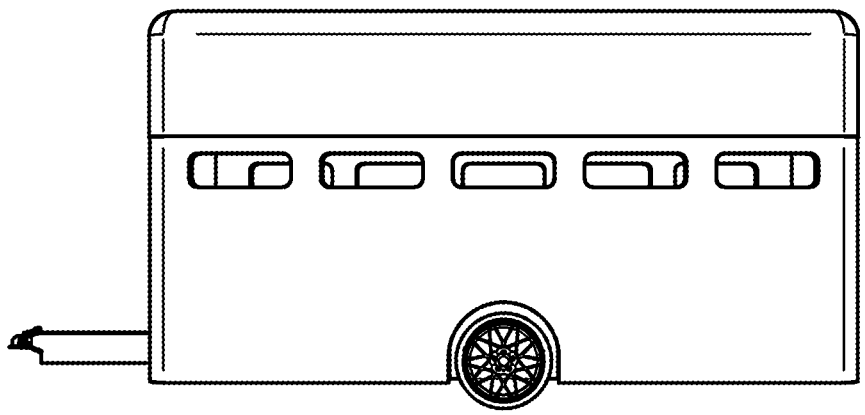
FIG. 1A is a side view of one embodiment of the invention.

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

The present invention discloses a trailer for towing and storing a recreational vehicle or other items which need to be kept safe.

In an embodiment of the invention, the trailer can operate between a storage mode, a travel mode, and a loading mode. In the loading mode, the roof is extended upward to allow for extra head space. In storage mode, the roof may be lowered, the tongue of the trailer may be retracted to take up less space, and the trailer may be lowered to the ground so it is not mobile. In travel mode, the tongue will be extended, the roof may be lowered to decrease wind resistance, and the trailer may be raised on the wheels. The mechanisms allowing operability between the various modes are discussed below.

In one embodiment of the invention, a trailer includes wheels which include an operable position and a stored position. In the stored position, the wheels are raised, or, from another aspect, the trailer is lowered, to a position where the wheels are inoperable. In one embodiment of the invention, the trailer is lowered all the way to the ground. The bottom of the trailer may be suited to sit on ground, or alternatively, the bottom of the trailer may include feet, rails, or another suspension system which supports the trailer when it is in stored inoperable position. When the trailer is to be used, the wheels are moved to the lowered position and the trailer is lifted off the ground.

In one embodiment of the invention, air shocks are used to lift the trailer off the ground. Preferably, the trailer also includes an air compressor which can fill the air shocks and lift the trailer, however, the air shocks may include a valve which can be used to fill the air shocks from an external air compressor or pump. In another embodiment of the invention, hydraulics are used to move the wheels from the first position to the second position. In other embodiments of the invention, jacks, lifts, or other lifting devices are used to lift the trailer, which may be human powered or otherwise.

Another problem with typical trailers is that they have a single door or gate through which to load the trailer. If the trailer is backed up to a wall, the trailer is then unable to be loaded or unloaded. One embodiment of the present invention includes both a front door and a back door through which the trailer can be loaded or unloaded. Preferably, both doors are hinged at the bottom and are strong enough to be used as ramps for a vehicle. In that embodiment, the trailer can be driven into from one side and exited from the other. This prevents the need to back the vehicle out of the trailer. It also allows a vehicle to enter the back side of the trailer while it is connected to a towing vehicle, and still exit if the tow-vehicle parks the back side of the trailer against a wall.

The doors may be able to operate as ramps while the trailer is on the ground or while the trailer is lifted. The doors may be able to swing between a closed position, which is typically when it is substantially vertical, and a first open position, which is when the trailer is on the ground, and a second open position, which is when the wheels are extended.

In one embodiment of the invention, the roof extends up to make extra headspace while loading and lowers for storage and/or travel. The roof may have an electric motor which extends the roof upward and downward. The motor may be controlled by a local, or alternatively by a remote program, such as an app on a telephone. The roof may also have a hand crank or other manual mechanism which allows the user raise and lower it manually.

One embodiment of the invention uses the roof as a locking mechanism for one or more of the doors. The bottom of the roof may be disposed above the top edge of doors when it is in its raised position, and below the top edge of the doors when it is in its lowered position. The roof may be slightly wider or longer or both than the body of the trailer, allowing the roof to envelop the lower body of the trailer and the top edges of the doors, effectively locking them in the vertical position, as shown in FIG. 2.

Additionally, the invention may save space by preventing the tongue of the trailer to stick out. This also may make the trailer safer because without the tongue, a thief will be unable to attach a vehicle to the trailer and tow it away. In one embodiment of the invention, the trailer tongue is detachable. In another embodiment of the invention, the trailer tongue is retractable. The trailer may have a compartment for storing the tongue directly behind the tongue's location when it is extended. The storage compartment may include a track, which guides the tongue into its stored position, and which may be manually operated or electronically operated with a motor. In another embodiment of the invention, the tongue is on one or more hinges, and rotates into a stored position. The tongue may have a single hinge allowing the whole tongue to rotate at once, as shown in FIG. 6. Alternatively, the tongue may disconnect into two or more pieces, which may be able to fold into a storage position. One such embodiment is shown in FIG. 5. The tongue may be able to fold into a storage compartment and be out of view, or it may be outside the trailer but taking up less space than its extended position. Additionally, the tongue storage compartment may have a cover 201 to hide the tongue and make the trailer more aesthetically pleasing. Preferably, the cover will be able to be locked to keep the tongue safe inside the compartment.

Other embodiment of the invention include using the trailer for humans. It may be a place for person to work or camp or sleep. For a person who has access to other amenities, such as a gym or a university, it may also be used as a small living space. In one embodiment of the invention, the may have sleeping area, either on the bottom or at an elevation. Beds may span the width of the trailer, as shown in FIG. 3. Preferably, the beds fold down from the walls of the trailer, so as to not interfere with putting a vehicle in the trailer.

Some embodiments of the invention include an electrical system in the trailer. In one embodiment, a battery, is charged by solar panels on the roof. The battery may be used for an air compressor to inflate the air shocks, for motors to raise and lower the roof, for electrical outlets that a person may use, or for other electrical needs. The battery may also include a charging port for charging from an external source.

Embodiments of the present invention allow the trailer to be fabricated with cheaper and faster processing methods than traditional trailers. The trailer may be made from stainless steel or aluminum, reducing the need to cover the material with an expensive coating process. A tab and slot method of fabrication may be used to assemble a trailer, providing an efficient and precise way to build the trailer. Further, non-additive laser welding may be used to produce high quality welds, to speed up manufacturing, and to aide automation. It also reduces material costs, provides smokeless manufacturing, which is less hazardous, and reduces and cleanup costs.

The preferred method of manufacturing the trailer of the present invention involves a tab and slot method, whereby a chassis and frame 203 are constructed from metal pieces cut from flat stock, such as an aluminum alloy or stainless steel. This technique has been well described in the following U.S. Patents, the entire disclosure of which are incorporated by reference: U.S. Pat. Nos. 8,398,159; 9,387,886; 9,802,663; and 10,604,192. By one method, a chassis and frame are constructed by the tab and slot method and a skin, such as a molded fiber reinforced polymer or a metal, such as an aluminum alloy or stainless steel, is attached thereto.

Figure 1B:
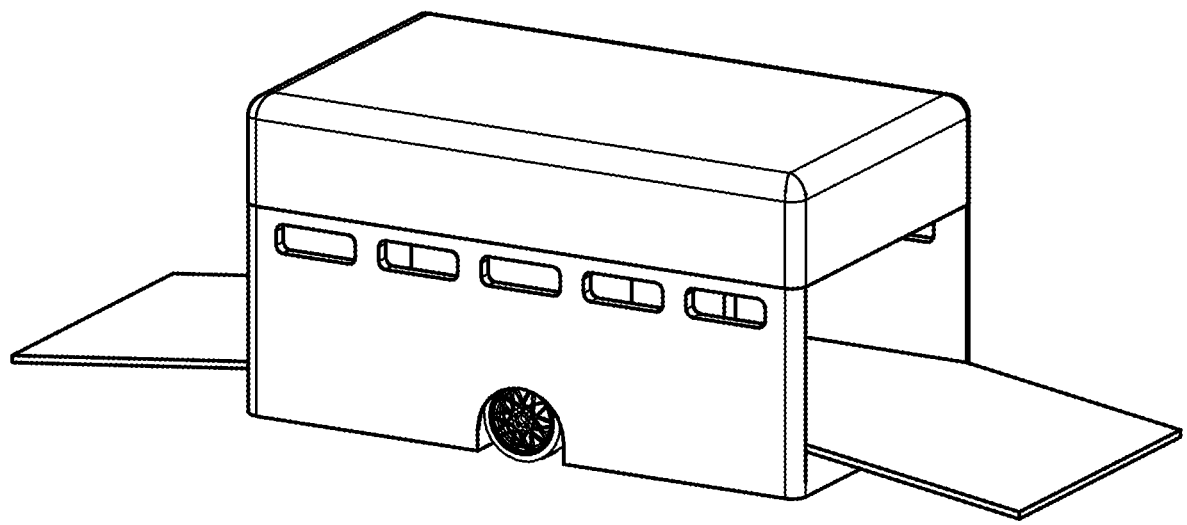
FIG. 1B is a perspective view of an embodiment of the invention with two doors open.

Now referring to FIGS. 1A and 1B, a trailer is shown in two modes. FIG. 1A shows a trailer in towing mode, including an extended tongue and wheels. In FIG. 1B, the trailer is parked with its tongue retracted and with both doors open, so a vehicle can drive through.

Figure 2A:
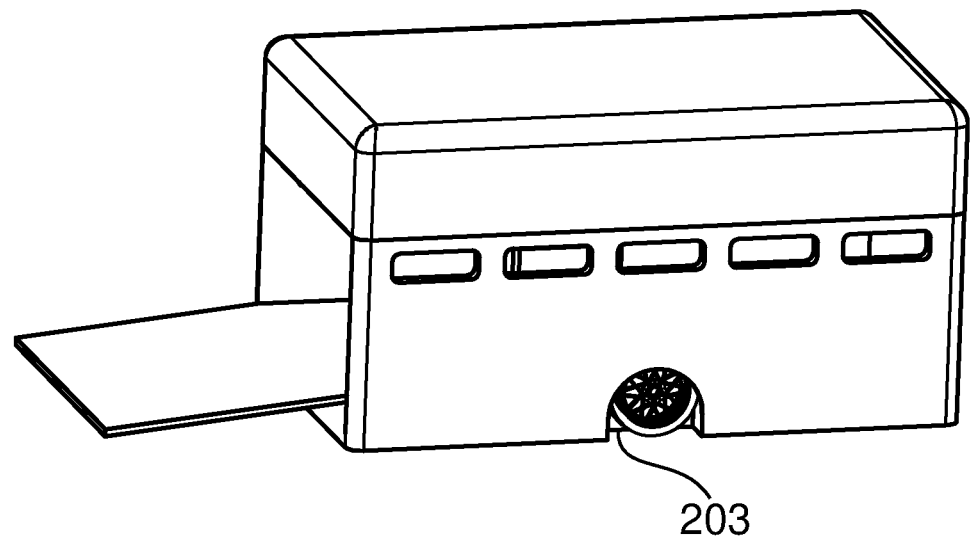
FIG. 2A is a perspective view of an embodiment of the invention with one door open.
Figure 2B:
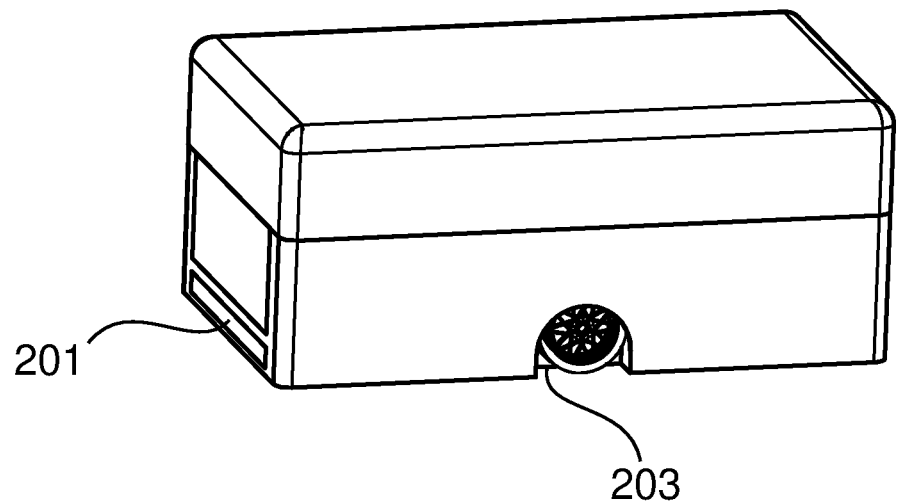
FIG. 2B is a perspective view of an embodiment of the invention in storage mode.

Now referring to FIGS. 2A and 2B. In FIG. 2A, the roof is up and the door is open for loading. FIG. 2B shows the trailer in storage mode, wherein the wheels and doors are up, the tongue is retracted, and the roof is lowered, securely locking the doors.

Figure 3A:
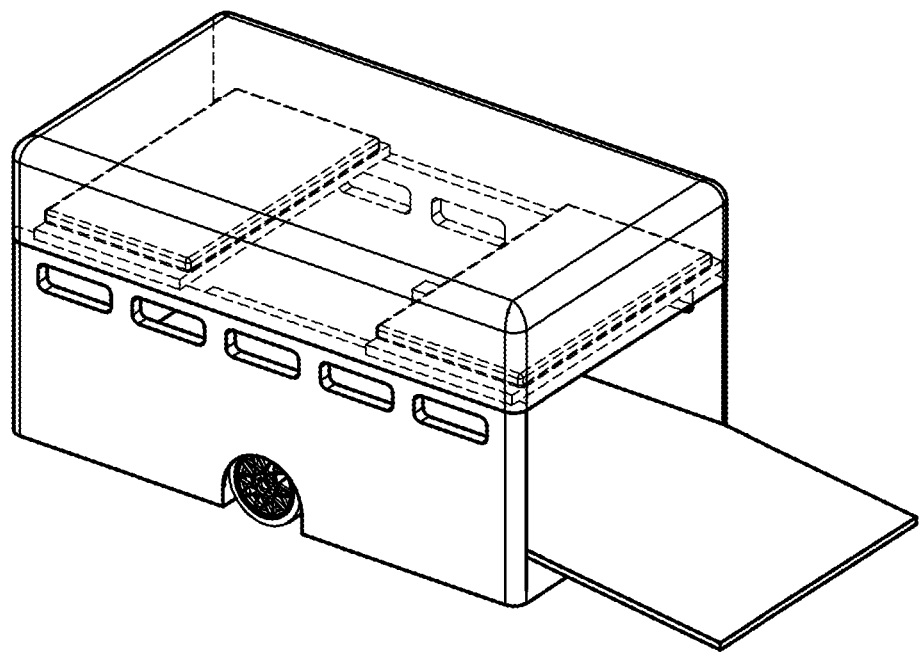
FIG. 3A is a perspective view of an embodiment of the invention showing beds for a user.
Figure 3B:
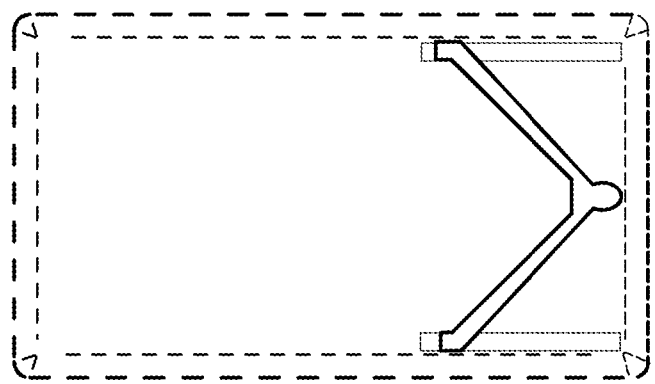
FIG. 3B is a top view of one embodiment of the invention showing a stored trailer tongue.

Now referring to FIG. 3. FIG. 3A shows beds spanning the width of the trailer for a user to sleep on. FIG. 3B is a top view showing an embodiment of a retractable trailer tongue, wherein the tongue is on a track allowing the tongue to retract straight back into a storage compartment.

Figure 4:
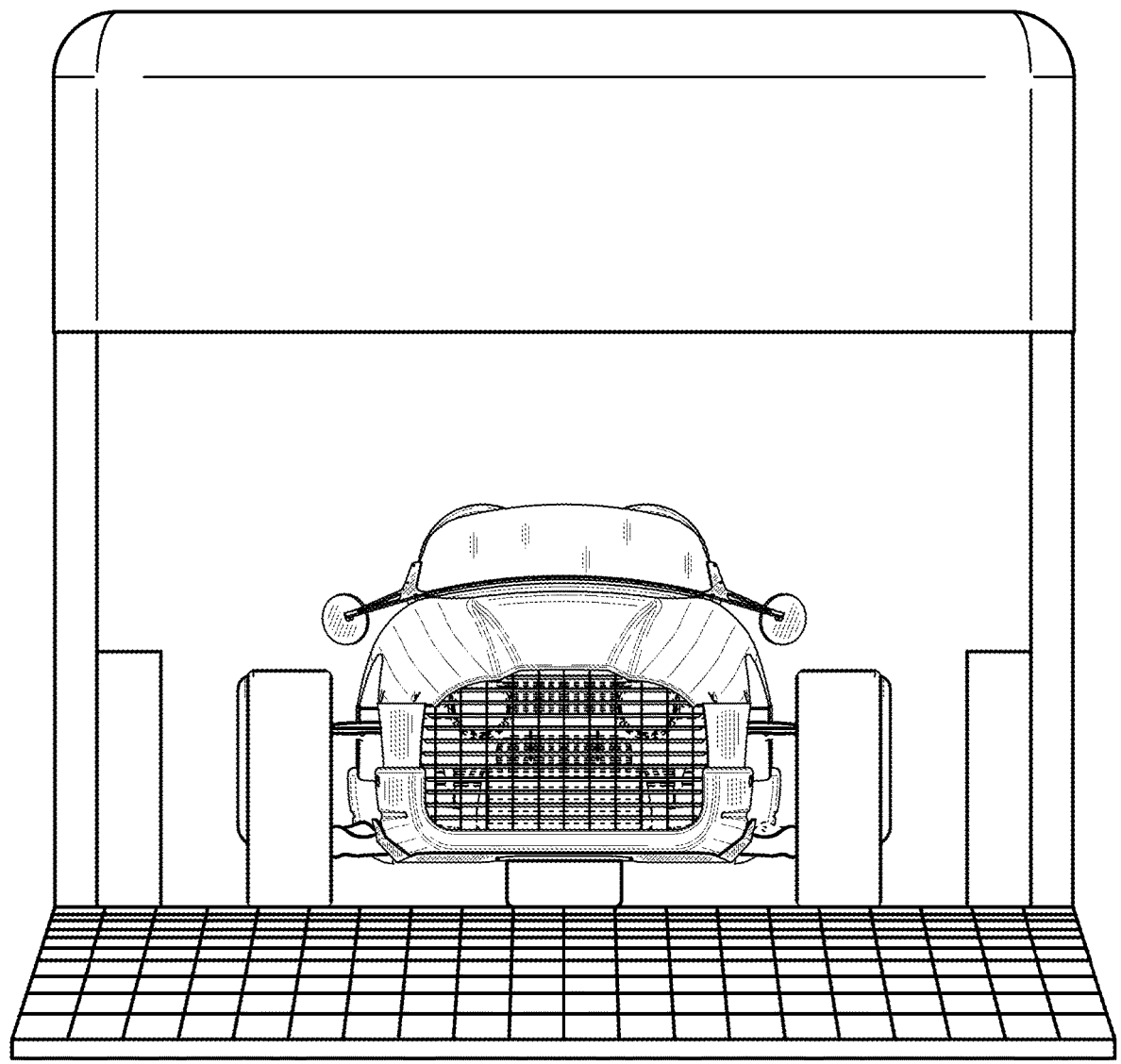
FIG. 4 is a front elevation view of one embodiment of the invention housing a vehicle.

Now referring to FIG. 4. A front view of a trailer is shown with a three-wheeled vehicle inside.

Figure 5A:
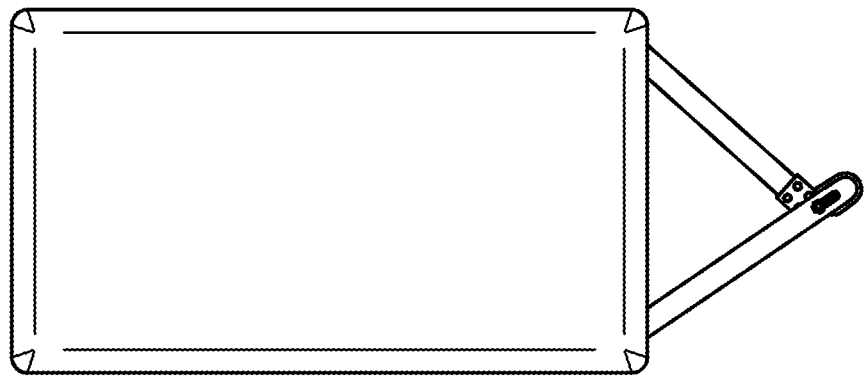
FIGS. 5A-5B are top views of one embodiment of the invention with a foldable A-frame tongue.
Figure 5B:
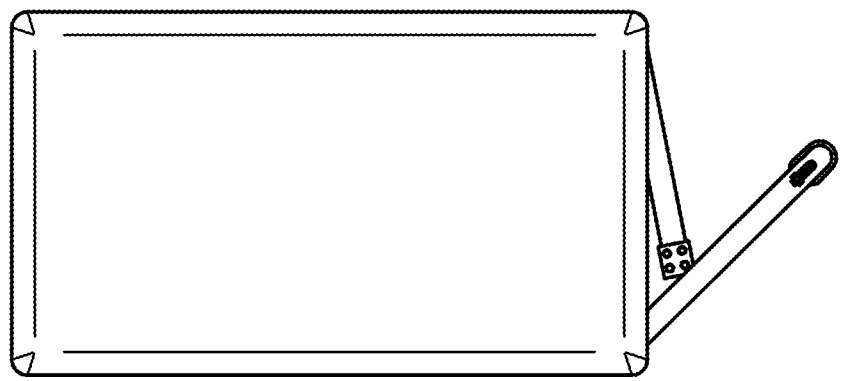
Figure 5C:
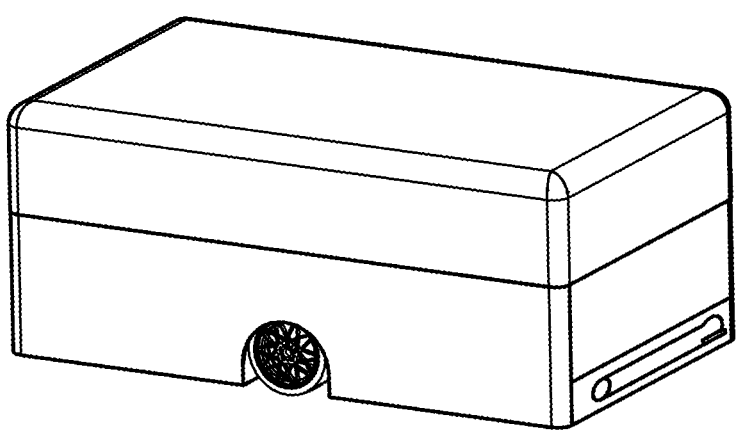
FIG. 5C is a side perspective view with a foldable A-frame tongue in storage position.
Figure 6:
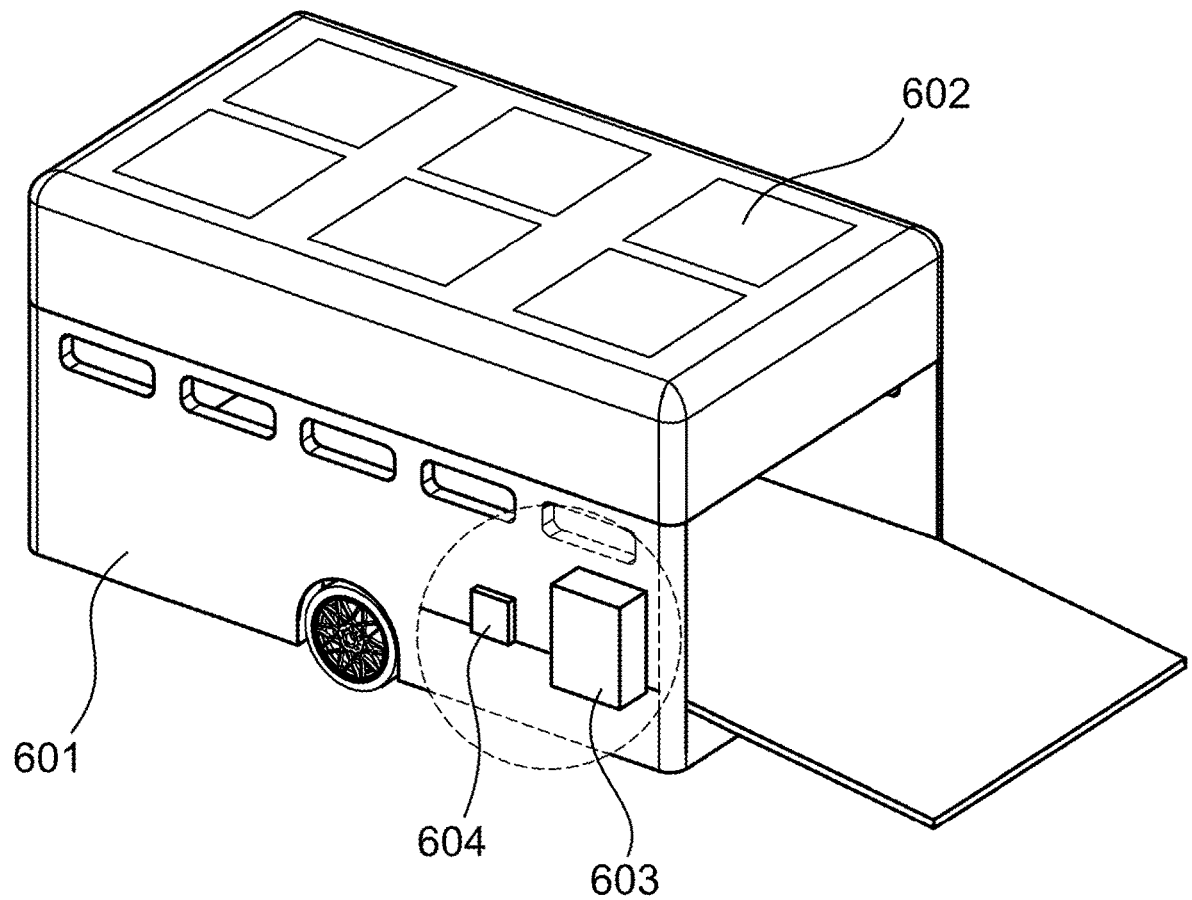
FIG. 6 is a perspective view of an embodiment of the invention with an electric system.

Now referring to FIGS. 5A-C, A trailer is shown with a folding A-frame tongue. FIG. 5A shows a folding tongue in operating position. FIG. 5B shows the folding A-frame tongue where two bars are disconnected. FIG. 5C shows the folding A-frame tongue in the folded position within a storage compartment.

FIG. 6 shows a trailer with an electrical system. A trailer 601 includes solar panels 602 which charge a battery 603. A pump for air shocks 604 to raise the trailer is powered by the battery.

All patents and published patent applications referred to herein are incorporated herein by reference. The invention has been described with reference to various specific and preferred embodiments and techniques. Nevertheless, it is understood that many variations and modifications may be made while remaining within the spirit and scope of the invention.

We claim:

1. A trailer comprising:
   a first door on one side of the trailer comprising a first hinge configured to allow the first door to operate between an open position and a closed position;
   a second door on an opposing side of the trailer comprising a second hinge configured to allow the second door to operate between an open position and a closed position;
   wherein the first and second doors are configured so that when they are in their open position, they extend outward and down to the ground such that they can both be used as ramps, such that a vehicle can drive up the first door, through the trailer, and down the second door;
   a roof;
   a trailer tongue with a coupling configured to attach to a hitch of a vehicle;
   two or more wheels that are extendable from an up position to a down position, wherein when the wheels are in the down position, the trailer is lifted off the ground;
   whereby, the trailer can change between at least three modes:
      a first mode for storage, wherein the first door and second door are in the closed position and the wheels are in the up position;
      a second mode for ingress and egress, wherein at least one of the first door and second door are in the open position; and
      a third mode for travel, wherein the first door and second door are in the closed position and the wheels are in the down position.

2. The trailer of claim 1 wherein the roof is extendable from a lowered position to a raised position, whereby the roof can be set in the lowered position for the first and third mode and set in the raised position for the second mode.

3. The trailer of claim 2 wherein the roof is a door lock, wherein the roof covers a top edge of the first door and a top edge of the second door when they are in the closed position preventing them from being opened when the roof is in the lowered position, and the roof does not cover the top edge of the first or second door when the roof is in the raised position.

4. The trailer of claim 2, further comprising windows, which windows are visible only when the roof is in the raised position.

5. The trailer of claim 1 further comprising a trailer tongue compartment.

6. The trailer of claim 3 wherein the tongue is retractable into the trailer tongue compartment.

7. The trailer of claim 3 wherein the tongue comprises a hinge for rotating the tongue into the storage compartment.

8. The trailer of claim 1 wherein the tongue folds in in two pieces.

9. The trailer of claim 4 wherein the trailer tongue compartment has a cover.

10. The trailer of claim 1 further comprising a bed spanning the width of the trailer at an elevation to allow storage space under the bed.

11. The trailer of claim 1, wherein the two or more wheels are moved between the up position and the down position by air pressure.

12. The trailer of claim 1, wherein the two or more wheels are moved between the up position and the down position by hydraulics.

13. The trailer of claim 1, further comprising at least one fold-down bed.

14. The trailer of claim 1 wherein the trailer comprises a unitized chassis made from frame members, comprising tabs and slots that are welded together.

15. The trailer of claim 14, wherein the frame members are welded using non-additive laser welding.

16. A trailer comprising:
   a first door on one side of the trailer with a top edge comprising a first hinge configured to allow the first door to operate between an open position and a closed position;
   a second door with a top edge on an opposing side of the trailer comprising a second hinge configured to allow the second door to operate between an open position and a closed position;
   a trailer tongue with a coupling configured to attach to a hitch of a vehicle;
   a roof with one or more lower edges, which is extendable from a lowered position to a raised position;
   wherein when the roof is in the raised position, the lower edge of the roof is above the top edge of the first and second door, and when the roof is in the lowered position, the lower edge of the roof is below the top edge of the first and second door, and wherein the roof prevents the doors from opening.

17. A trailer comprising:

a first door on one side of the trailer comprising a first hinge configured to allow the first door to operate between an open position and a closed position;

a second door on an opposing side of the trailer comprising a second hinge configured to allow the second door to operate between an open position and a closed position;

a roof that is extendable from a lowered position to a raised position, whereby the roof can be set in the lowered position for a first and third mode and set in the raised position for a second mode; and wherein the roof is a door lock, wherein the roof covers a top edge of the first door and a top edge of the second door when they are in the closed position preventing them from being opened when the roof is in the lowered position, and the roof does not cover the top edge of the first or second door when the roof is in the raised position;

a trailer tongue with a coupling configured to attach to a hitch of a vehicle;

two or more wheels that are extendable from an up position to a down position, wherein when the wheels are in the down position, the trailer is lifted off the ground;

whereby, the trailer can change between at least three modes:

the first mode for storage, wherein the first door and second door are in the closed position and the wheels are in the up position;

the second mode for ingress and egress, wherein at least one of the first door and second door are in the open position; and the third mode for travel, wherein the first door and second door are in the closed position and the wheels are in the down position.

* * * * *